May 23, 1939.  L. F. POOCK ET AL  2,159,343

GAUGING APPARATUS

Filed Dec. 22, 1937  3 Sheets-Sheet 1

INVENTOR
Louis F. Poock
BY Willis Fay Allen
Maréchal & Noé
ATTORNEY

May 23, 1939.  L. F. POOCK ET AL  2,159,343
GAUGING APPARATUS
Filed Dec. 22, 1937   3 Sheets-Sheet 2
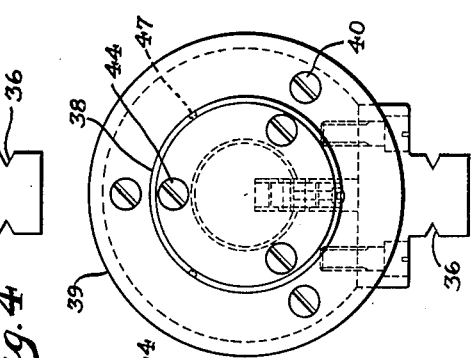
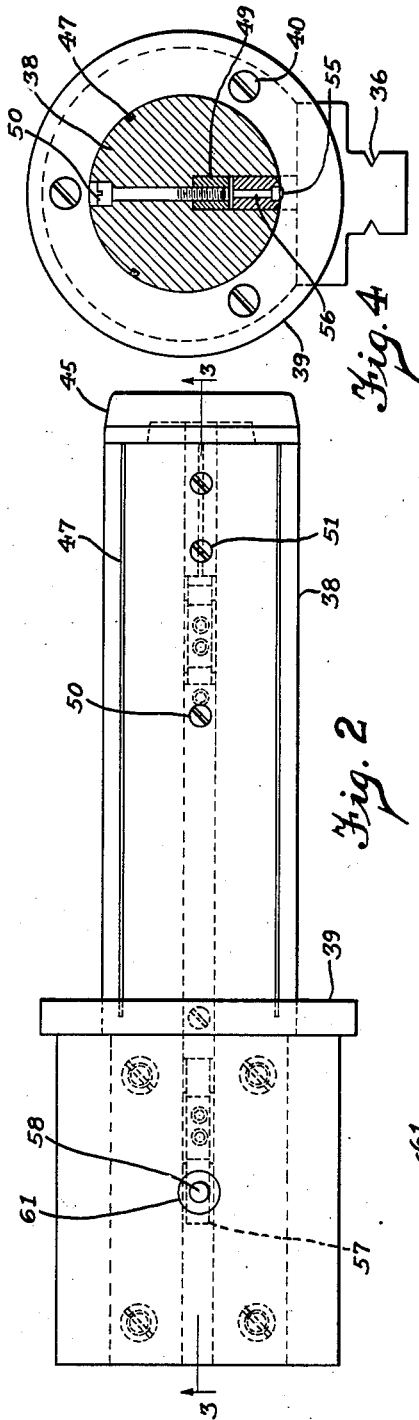
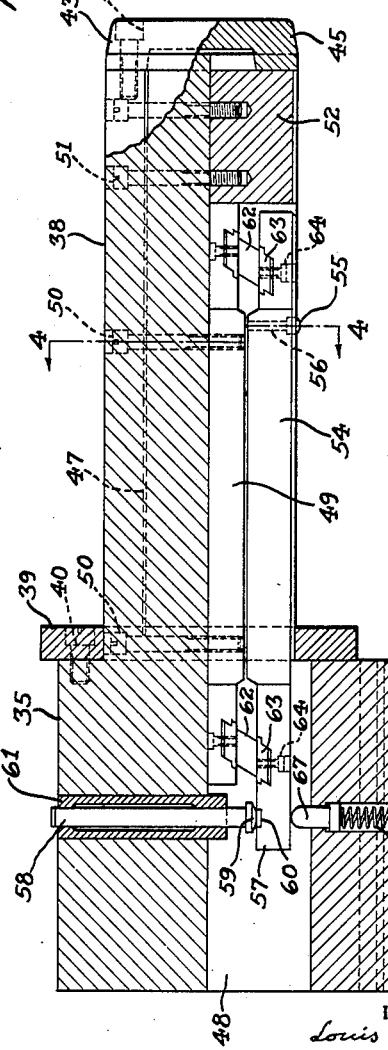
INVENTOR
Louis F. Poock
BY Willis Fay Aller
Maréchal + Noir
ATTORNEY

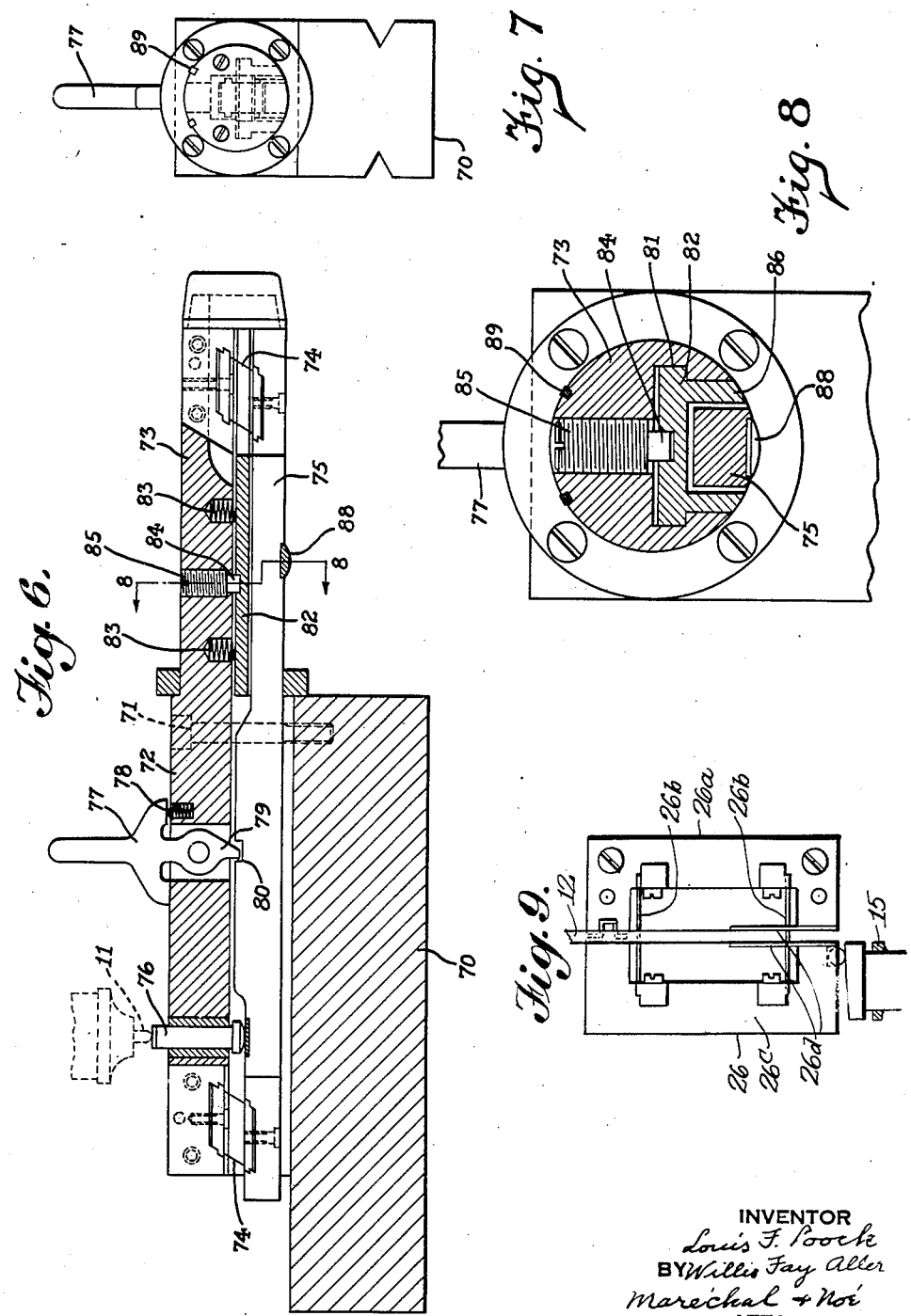

Patented May 23, 1939

2,159,343

UNITED STATES PATENT OFFICE 2,159,343

GAUGING APPARATUS

Louis F. Poock and Willis Fay Aller, Dayton, Ohio, assignors to The Sheffield Gage Corporation, Dayton, Ohio, a corporation of Ohio Application December 22, 1937, Serial No. 181,068

6 Claims. (Cl. 33—178)

This invention relates to gauging apparatus and more particularly to gauging devices adapted to measure internal diameters and the like of work pieces to be gauged.

One object of the invention is the provision of a gauging apparatus having a work engaging portion at a point comparatively remote from a gauge actuating portion of an actuating member which is supported for parallel motion so that the gauge actuating portion of the member will be moved equally and similarly to the portion which engages the work.

Another object of the invention is the provision of a gauging apparatus of the character mentioned adapted for measuring internal diameters and the like on work pieces to be gauged, such apparatus having a gauge actuating member one portion of which is operated by the work piece, the actuating member being supported on a work carrying part for parallel movement by means of spring members fixed at opposite ends thereof to the work carrying part and to the actuating member.

Other objects and advantages of the invention will be apparent from the following description, the appended claims and the accompanying drawings, in which:

Fig. 2 is a top plan view of the work supporting device;

Fig. 3 is a vertical section on the line 3—3 of Fig. 2;

Fig. 4 is a vertical section taken transversely through the work supporting arbor on the line 4—4 of Fig. 3;

Fig. 5 is an end view of the work supporting device;

Fig. 6 is a vertical central section through a work supporting attachment of modified construction;

Fig. 7 is an end view of the construction shown in Fig. 6;

Fig. 8 is a section on the line 8—8 of Fig. 6; and

Fig. 9 is a detail view of a portion of the indicating means showing its connection to the plunger.

Figure 1:
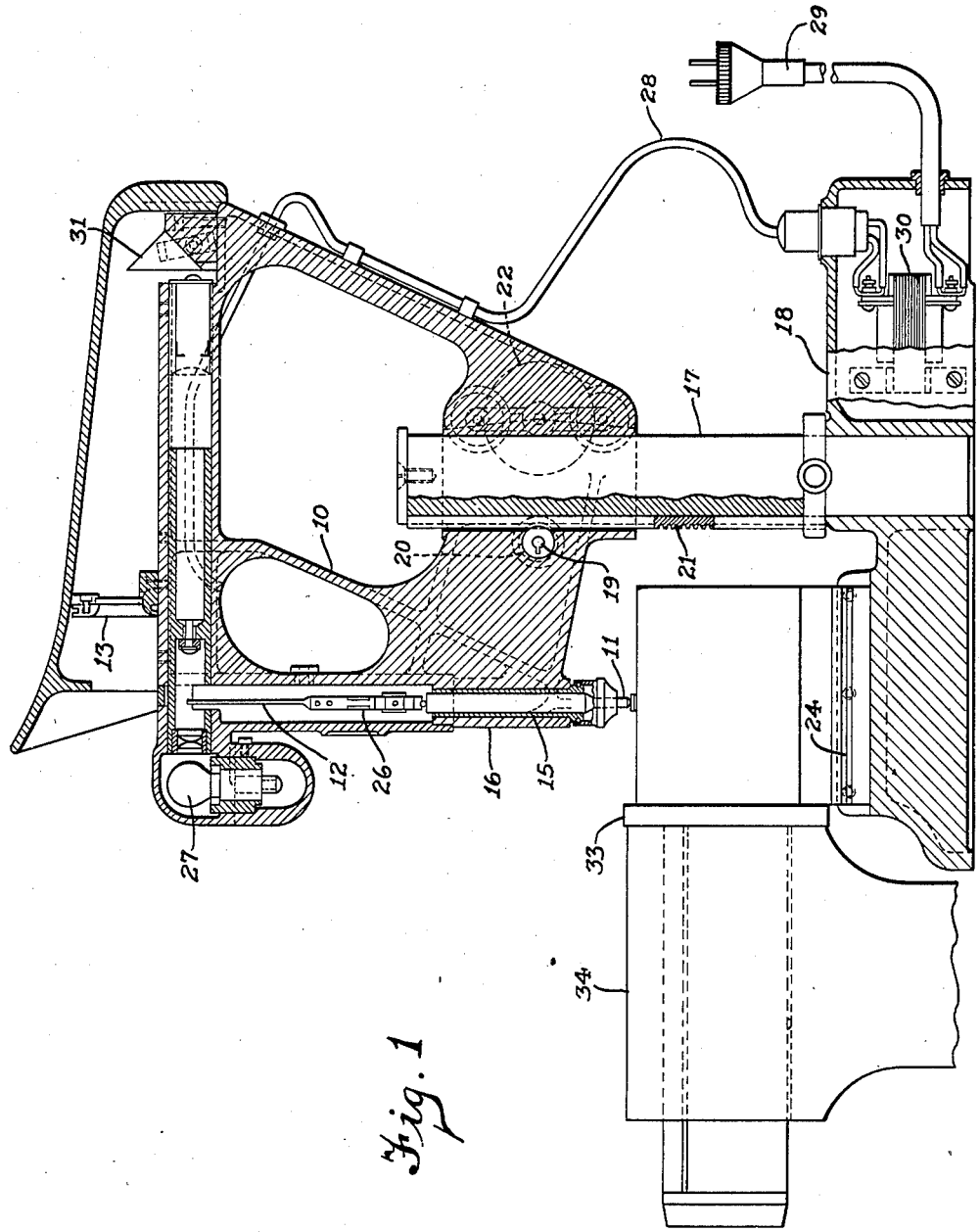
Fig. 1 is a central vertical section of a gauging apparatus having a work supporting device embodying the present invention.

Referring more particularly to the drawings by reference numerals, 10 generally designates a gauging instrument having a movable gauging element 11 and having an indicating means 12 operable in accordance with the movements of the gauging element, the location of the indicating means being apparent on a scale or indicating device 13. While the gauging instrument 10 may be of any suitable character for the purpose intended, as herein shown the gauging element 11 is vertically slidable in a sleeve 15 carried by a housing 16. The latter may be vertically positioned on a supporting post 17 carried by the base portion 18 of the instrument frame, vertical adjustment of the housing 16 being effected by rotating a shaft 19 on which is the gear 20 which meshes with rack teeth 21 on one side of the post 17. Suitable clamp means including a rotatable clamp wheel 22 are provided for holding the housing 16 in any adjusted position.

In measuring external dimensions, outside diameters, etc., the work to be measured is placed between an anvil which is removably carried by a guideway 24 in the base frame 18, and with the housing 16 in proper position, any oversize or undersize of the work being measured will be apparent on the scale 13 when the plunger 11 contacts with the upper side of the work piece. The plunger 11 is urged downwardly in a yielding manner and may be arranged in accordance with the prior application of W. F. Aller, Serial No. 128,422 filed March 1, 1937. The plunger is moved upwardly and controls the movements of the indicating mechanism shown at 26, including a pointer or indicator line which swings transversely of the plane of the section of Fig. 1. The mechanism 26 may comprise a stationary block 26a connected by springs 26b to a vertically movable block 26c, the lower ends of the two blocks being connected by spaced parallel spring blades 26d to the lower end of the part 12. The source of light 27, energized through electrical connections 28 and 29 and the transformer 30, is located at one side of the indicator 12 so that the shadow of the indicator line will be reflected from the prism surfaces 31 so as to be apparent on a ground glass screen on the rear surface of the scale 13.

The attachment device 33 as shown in Figs. 1 to 3 is one that can be readily applied to the base frame 18 and positioned on the guideway 24 after removing the usual anvil, in order to adapt the gauging apparatus to measure or gauge internal dimensions, inside diameters of work pieces, and other similar measurements. The work piece being measured may be a connecting rod for example, a portion of such a work piece being shown at 34 in Fig. 1.

The internal measuring attachment comprises a main base 35, preferably made as a metal casting. At opposite sides of the lower portion of the casting are V-shaped grooves 36 into which locking screws provided in the base frame 18 may be engaged in order to fix the bottom of the base 35 in the gauging instrument. Extending from one side of the base 35 is a work supporting arbor 38 the diameter of which is very slightly less than the internal diameter of work pieces to be gauged, and which are adapted to be moved onto the arbor 38 so as to be supported thereby during the gauging operation. At the inner end of the arbor 38 an abutment ring 39 is preferably provided for contacting the end of the work piece and positioning it properly on the work supporting arbor, the ring 39 being detachably connected by screws 40 threaded in the base 35 as shown in Fig. 3.

On the outer end of the arbor 38 is an end piece 43, held in place by attaching screws 44, and having a suitably tapered surface 45 to facilitate mounting of the work piece on the arbor. On the upper side of the arbor are hard wear resisting strips 47 of carbaloy or the like, seated and fixed in grooves extending longitudinally of the arbor and projecting slightly from the rounded surface of the arbor so they may engage the internal surface of the work piece.

The base 35 is provided with a longitudinally extending passage 48 in which is fixed an anchorage bar 49, the latter being held in fixed position by means of screws 50 which extend downwardly through the upper portion of the arbor and thread into the bar 49. Similar screws 51 are threaded into and support a filler block 52 which is arranged between the end of the bar 49 and the end piece 43. Below the bar 49 is an elongated rigid actuating member or bar 54 having a work engaging portion 55, preferably in the form of a stud 56 having a hard head projecting a little distance downwardly from the lower surface of the bar 54 and beyond the circle defined by the surface of the arbor 38. The bar 54 is supported for parallel motion so that as it moves it will remain parallel to its original position, and the inner end 57 of the bar will thus be moved equally and similarly to the movement of the work contacting portion 55, the component of movement of the bar 54 at right angles to the work axis being transmitted to the gauging element 11 by means of an axially movable plunger 58 which projects upwardly a short distance from the top of the base 35 and which is provided with a hard rounded end 59 that rides on a hard flat metal insert 60 provided in fixed position near the inner end 57 of the actuating bar 54. The plunger 58 is guided for axial movement in a supporting sleeve 61 which is preferably pressed in place in the base 35.

The means for supporting the bar 54 for parallel motion, as will be apparent from Fig. 3, comprises parallel spring blades 62 each having an anchorage at one end thereof to the fixed bar 49 and an anchorage at the other end to the actuating member 54 so that no lost motion is present. The spring blades 62 are preferably thin resilient metal strips the ends of which are clamped securely in place by means of clamp blocks 63 which are held tightly on the bars by means of attaching screws 64 with the ends of the blocks 63 clamped rigidly against the ends of the spring blades. The spring blades 62 are preferably inclined at a suitable angle to both bars, and since all the spring blades are of the same length and are parallel to one another, any movement of the bar 54 that takes place is such that the bar moves parallel to itself. The movement of the inner end 57 of the bar that takes place in a direction in line with the axis of the plunger 59 is exactly in accordance with the radial component of the movement of the work engaging portion 55 as the latter is forced inwardly when a work piece is moved on the arbor. As the bar 54 is forced inwardly the component of its movement in the direction of its own length is without effect, the hard flat surface 60 sliding with relation to the rounded lower end 59 of the axially movable member 58, but the component of the movement of the member 58 perpendicular to the work axis is transmitted accurately to the gauging mechanism and the amount of oversize or undersize of the work piece may be indicated by the reading of the instrument in comparison with the reading obtained with a standard work piece of standard size.

In its normal position in a gauging operation, the upper end of the member 58 and the lower end of the gauging element 11 are held yieldingly in contact with one another since the latter is urged downwardly under suitable spring tension as previously described, and the weight of the actuating bar 54 is counterbalanced by means of a spring 66 which yieldingly holds a plunger 67 in engagement with the lower side of the inner end of the actuating member 54, the spring tension being adjustable by turning a screw 69 so as to determine the normal lowermost position of the bar 54 with the work engaging portion 55 projecting down far enough to contact the inner surface of a work piece to be tested when the latter is moved in place. The spring 66 is preferably sufficiently tensioned to hold the bar 54 so that when a gauging operation takes place, if the work is of the proper size, the blades 62 will be substantially straight.

Figs. 6, 7, and 8 show a modified form of construction in which a spring pressed pressure member is employed to hold the work so that the axis of the hole being gauged is in perfect alignment with the work supporting arbor. Referring to these figures, the device comprises a base 70 adapted for mounting on the frame base of the instrument. Secured to the base 70 by means of bolts 71 arranged at opposite sides of the base is a fixed upper supporting member 72 having an extension 73 forming a work supporting arbor. The upper portion 72 of the base is connected by means of flexible metal blades 74 to the elongated actuating bar 75 in the same manner as in the form of construction first described, so that parallel motion is imparted to the bar 75 when it is engaged and moved upwardly by the work, this upward movement of the bar being transmitted through the axially movable member 76 to the gauging element 11 of the indicating apparatus. Pivotally connected to the upper portion of the base is a lever 77 normally held in the position shown in Fig. 6 by means of a spring 78. The lever 77 is provided with an arm 79 extending into a recess 80 in the bar 75. Normal operations of the bar 75 may take place without interference from the arm 79, but the latter may be operated clockwise from the position shown in order to force the bar 75 towards the left at any time so that one may ascertain that no lost motion is present between the gauging element 11 and the bar 75, or to operate the gauging instrument for any other reason desired.

The arbor 73 is provided with a substantially T-shaped recess 81 receiving a pressure member 82 which is urged downwardly by springs 83 and guided against endwise movement and for movement in a radial direction only by a round stud 84 in the lower end of the screw 85 which is threaded in the arbor 73. The lower spaced ends 86 of the spring pressed member 82 are yieldingly held against the inner surface of the work piece being gauged and maintains the axis of the hole in the work piece in exact parallelism with the axis of the arbor 73. The actuating bar 75 is provided with a work engaging portion 88 of suitable hard material, and carbaloy strips or the like 89 are provided in the upper portions of the arbor 73 and project slightly from the circle defined by the outer surface of the arbor. It will be apparent that the motion imparted by the work to the work engaging portion of the elongated actuating member will be accurately and exactly duplicated at the other end of the member where it engages the gauge operating mechanism, as in the form of construction first described.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. Gauging apparatus of the character described comprising a base, a work supporting arbor on said base, an elongated actuating member extending longitudinally along said arbor and having a work actuated portion near one end adapted for engagement with an internal surface of a work piece supported by said arbor and having a gauge actuating part remote from the work actuated portion operable in accordance with the movements of said portion, and means supporting said actuating member on said arbor for parallel motion.

2. Gauging apparatus of the character described comprising a base, a work supporting arbor on said base, an elongated actuating member extending longitudinally along said arbor and having a work actuated portion near one end adapted for engagement with an internal surface of a work piece supported by said arbor and having a gauge actuating part remote from the work actuated portion operable in accordance with the movements of said portion, and spring members fixed to said actuating member and arbor supporting said actuating member for parallel motion.

3. Gauging apparatus of the character described comprising a base, a work supporting arbor on said base, an elongated actuating member extending longitudinally along said arbor and having a work actuated portion near one end adapted for engagement with an internal surface of a work piece supported by said arbor and having a gauge actuating part remote from the work actuated portion operable amounts equal to the movements of said portion, and parallel spaced spring blades arranged at an inclination to said actuating member and fixed at their ends to said actuating member and arbor.

4. Gauging apparatus of the character described comprising a base, a work supporting arbor on said base, an elongated actuating member extending longitudinally along said arbor and having a work actuated portion near one end adapted for engagement with an internal surface of a work piece supported by said arbor, an axially moveable gauge operating member mounted in said base for movement in a direction substantially transversely of said elongated actuating member and contacting the same at a point remote from said work actuated portion, and spring means fixed at one end to said actuating member and at the other end to said arbor and supporting said actuating member for parallel motion.

5. Gauging apparatus of the character described comprising a base adapted to be secured to a gauging instrument, a work supporting arbor on said base, an actuating bar extending along said arbor and having a work actuated portion near one end adapted for positioning by an internal surface of a work piece supported by said arbor, said bar having a gauge actuating part remote from the work actuated portion operable in accordance with the movements of said portion, spring members fixed to said bar and arbor and supporting said bar for parallel motion, and spring means for counterbalancing the weight of said bar.

6. Gauging apparatus of the character described comprising a gauging instrument having a movable gauging element and having indicating means operable in accordance with the movements of such gauging element, a frame for said gauging instrument having a base supporting portion, a base detachably mounted on said base supporting portion, a work supporting arbor on said base, an actuating bar extending longitudinally of said arbor at the lower side thereof and having a work actuated portion near one end adapted for positioning by an internal surface of a work piece supported by said arbor, an axially movable member operably mounted in said base and actuating said gauging element, said member engaging a part of said bar remote from the work actuated portion, and parallel spring members interconnecting said bar and base and supporting said bar for parallel motion.

LOUIS F. POOCK.
WILLIS FAY ALLER.